United States Patent
Yang et al.

(10) Patent No.: US 8,646,597 B2
(45) Date of Patent: *Feb. 11, 2014

(54) GAS STORAGE CANISTER WITH COMPARTMENT STRUCTURE

(75) Inventors: Jefferson Y S Yang, Orange, CA (US);
Cheng-Ham Liao, Miaoli (TW);
Feng-Hsiang Hsiao, Miaoli (TW);
Tzu-Wei Kuo, Miaoli (TW)

(73) Assignee: Asia Pacific Fuel Cell Technologies, Ltd., Miaoli (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,693

(22) Filed: Dec. 21, 2011

(65) Prior Publication Data

US 2012/0160712 A1 Jun. 28, 2012

(30) Foreign Application Priority Data

Dec. 23, 2010 (TW) ................................ 99145540 A

(51) Int. Cl.
*F17C 11/00* (2006.01)
*F17C 1/02* (2006.01)

(52) U.S. Cl.
USPC ............. 206/0.7; 220/581; 220/592; 429/515

(58) Field of Classification Search
USPC .......... 206/0.6, 0.7; 220/4.14, 4.15, 562–564,
220/581, 592; 244/135 B, 135 R; 429/515
See application file for complete search history.

(56) References Cited

U.S. PATENT DOCUMENTS

| | | | |
|---|---|---|---|
| 4,032,457 A * | 6/1977 | Matchett ........................ | 210/489 |
| 4,667,815 A * | 5/1987 | Halene ........................... | 206/0.7 |
| 4,819,718 A * | 4/1989 | Ishikawa et al. ......... | 165/104.12 |
| 5,953,922 A * | 9/1999 | Stetson et al. ................... | 62/46.2 |
| 6,182,717 B1 * | 2/2001 | Yamashita ....................... | 141/82 |
| 6,418,275 B1 * | 7/2002 | Yang .............................. | 392/441 |
| 6,626,323 B2 * | 9/2003 | Stetson et al. ................ | 220/577 |
| 6,634,321 B2 * | 10/2003 | Hussain et al. ..................... | 123/3 |
| 6,709,497 B2 * | 3/2004 | Myasnikov et al. ............ | 96/126 |
| 6,742,650 B2 * | 6/2004 | Yang et al. ..................... | 206/0.7 |
| 6,857,396 B2 * | 2/2005 | Yang et al. .................... | 122/19.2 |

(Continued)

FOREIGN PATENT DOCUMENTS

| | | |
|---|---|---|
| EP | 61191 A1 * | 9/1982 |
| EP | 0188996 | 7/1986 |

(Continued)

*Primary Examiner* — J. Gregory Pickett
*Assistant Examiner* — Ned A Walker
(74) *Attorney, Agent, or Firm* — Evan R. Witt; Kirton McConkie

(57) ABSTRACT

A gas storage canister includes a canister body, at least one supporting plate, at least one gas-guiding rod, and at least one compartment structure. The canister body has a bottom end, an outlet opposed to the bottom end, and an inner space. The bottom end and the outlet are arranged along a long axis direction. The supporting plate is accommodated within the inner space along the long axis direction. The supporting plate has at least one communication part. The gas-guiding rod is penetrated through the communication part of the supporting plate. The gas-guiding rod has at least one gas inlet/outlet end for guiding a gas. The compartment structure includes a plurality of compartments. The compartment structure and the supporting plate are accommodated within the inner space of the canister body. Each of the compartments stores a predetermined amount of gas storage material.

6 Claims, 15 Drawing Sheets

(56) References Cited

U.S. PATENT DOCUMENTS

| | | | |
|---|---|---|---|
| 6,991,770 B2* | 1/2006 | Suzuki et al. | 422/198 |
| 6,993,888 B2* | 2/2006 | Yang et al. | 53/447 |
| 7,211,228 B2* | 5/2007 | Suzuki et | 422/198 |
| 7,431,756 B2* | 10/2008 | Myasnikov et al. | 96/126 |
| 7,947,119 B2 | 5/2011 | Golz et al. | 95/116 |
| 2002/0006365 A1* | 1/2002 | Suzuki et al. | 422/177 |
| 2002/0117123 A1* | 8/2002 | Hussain et al. | 123/3 |
| 2002/0134370 A1 | 9/2002 | Suzuki et al. | |
| 2003/0019765 A1 | 1/2003 | Yang et al. | |
| 2003/0160054 A1* | 8/2003 | Stetson et al. | 220/577 |
| 2003/0209147 A1* | 11/2003 | Myasnikov et al. | 96/146 |
| 2003/0215684 A1* | 11/2003 | Yang et al. | 429/26 |
| 2003/0215688 A1* | 11/2003 | Yang et al. | 429/34 |
| 2004/0178083 A1* | 9/2004 | Yang et al. | 206/0.7 |
| 2005/0211573 A1* | 9/2005 | Myasnikov et al. | 206/0.7 |
| 2010/0219087 A1* | 9/2010 | Fujita et al. | 206/7 |
| 2012/0160711 A1* | 6/2012 | Yang et al. | 206/6 |

FOREIGN PATENT DOCUMENTS

| | | |
|---|---|---|
| EP | 0995944 | 4/2000 |
| EP | 1286406 | 2/2003 |
| EP | 1454875 | 9/2004 |
| EP | 1454876 | 9/2004 |
| JP | 2005336040 | 12/2005 |

* cited by examiner

US 8,646,597 B2

GAS STORAGE CANISTER WITH COMPARTMENT STRUCTURE

FIELD OF THE INVENTION

The present invention relates to a gas storage canister, and more particularly to a gas storage canister with a compartment structure or lattice.

BACKGROUND OF THE INVENTION

A fuel cell is a device that converts the chemical energy from a hydrogen-containing fuel into electricity through a chemical reaction with air. Consequently, the fuel cell is categorized as a new energy source. The hydrogen-containing fuel used in the fuel cell includes any type of hydrocarbon such as natural gas, methanol, ethanol (alcohol), product from water hydrolysis, marsh gas, or the like.

The hydrogen gas is usually filled in a gas storage canister with metal hydride, so that the hydrogen gas is adsorbed and stored by the metal hydride. For using the hydrogen gas, the gas storage canister should be properly heated to release the hydrogen gas to the application device. Consequently, the fuel cell manufacturers make efforts in designing novel gas storage canisters for providing more stable and sustained hydrogen gas.

Conventionally, the gas storage material (e.g. metal hydride) is directly accommodated within a canister body of the gas storage canister. Since the gas storage material is usually in a powdery form and the gas storage material is accommodated within a single receptacle of the canister body, if the volume of the gas storage material is too large, the gas storage material fails to be uniformly and stably heated. Under this circumstance, the efficiency of releasing the gas (e.g. the hydrogen gas) from the gas storage material is deteriorated. For solving these drawbacks, the researchers are devoted to the methods of partitioning the gas storage material within the gas storage canister. Unfortunately, these methods are unsatisfied because the thermal expansion of the gas storage material may result in deformation of the partition articles. Under this circumstance, the gas storage material may be leaked to and stacked over other partition layers or a non-uniform heating problem occurs, so that the performance of the gas storage canister is impaired.

SUMMARY OF THE INVENTION

The present invention provides a gas storage canister with a compartment structure for locally accommodating the gas storage material within a plurality of compartments.

The present invention also provides a gas storage canister for storing the gas storage material, in which the partition articles for accommodating the gas storage material has enhanced structural strength and tightness.

In accordance with an aspect of the present invention, there is provided a gas storage canister. The gas storage canister includes a canister body, a plurality of housings, at least one gas guide rod, and a plurality of compartment structures or lattice. The housings, the gas guide rod and the compartment structures are disposed within the canister body. The canister body has a bottom end, an outlet opposed to the bottom end, and an inner space, wherein the bottom end and the outlet are arranged along a long axis direction.

The housings are accommodated within the inner space of the canister body along the long axis direction. Each of the housings includes a base, a peripheral wall, and at least one gas-conducting structure. The peripheral wall is vertically extended from a periphery of the base, wherein a receptacle is defined by the base and the peripheral wall. The base has at least one communication part.

The gas guide rod has at least one gas inlet/outlet end. Through the gas inlet/outlet end of the gas guide rod, a gas can be guided to and adsorbed by the gas storage material, which is accommodated within the housings. In addition, through the gas inlet/outlet end of the gas-guiding rod, the gas released from the gas storage material is guided to the outlet of the canister body. Consequently, the gas-guiding rod is connected with an application device or a fuel cell system.

The compartment structures are accommodated within the receptacles of respective housing. Each of the compartment structures includes a plurality of compartments, which are defined by a plurality of partition plates, thereby forming a lattice. Each of the compartments stores a predetermined amount of gas storage material.

By means of the present technology, a predetermined amount of gas storage material is accommodated within the compartment of the compartment structure, so that the gas storage material is locally distributed. Consequently, during operation of the fuel cell system, the gas storage canister allows the external heat to be uniformly conducted to the compartments of all compartment structures. Since the heat applied to the inner portion and the outer portion of the gas storage material are not obviously distinguished during the heating stage, the released gas can be outputted more uniformly and stably. Under this circumstance, the operating efficacy of the present invention is enhanced. Moreover, since the compartment structure is accommodated within the receptacle of the housing and the partition plate is effective to reinforce the structural strength of the housing, the operation of the gas storage canister is more stable, and the working efficiency of the fuel cell system is enhanced. In such way, a gas storage cartridge is modularized to facilitate production, assembly and application, so that the industrial utilization is enhanced.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
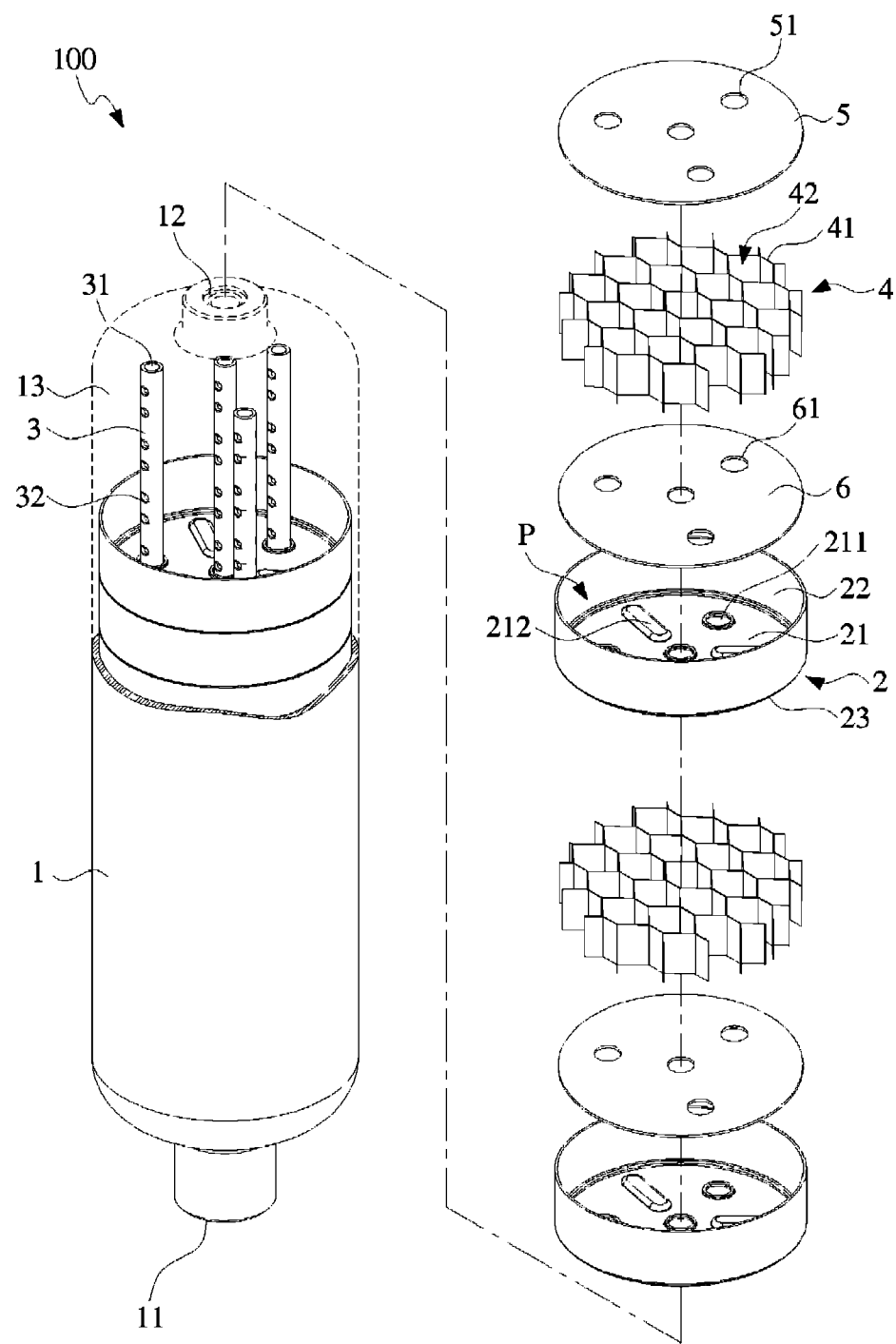
FIG. 1 is a schematic exploded view illustrating a gas storage canister with a compartment structure according to a first embodiment of the present invention.
Figure 2:
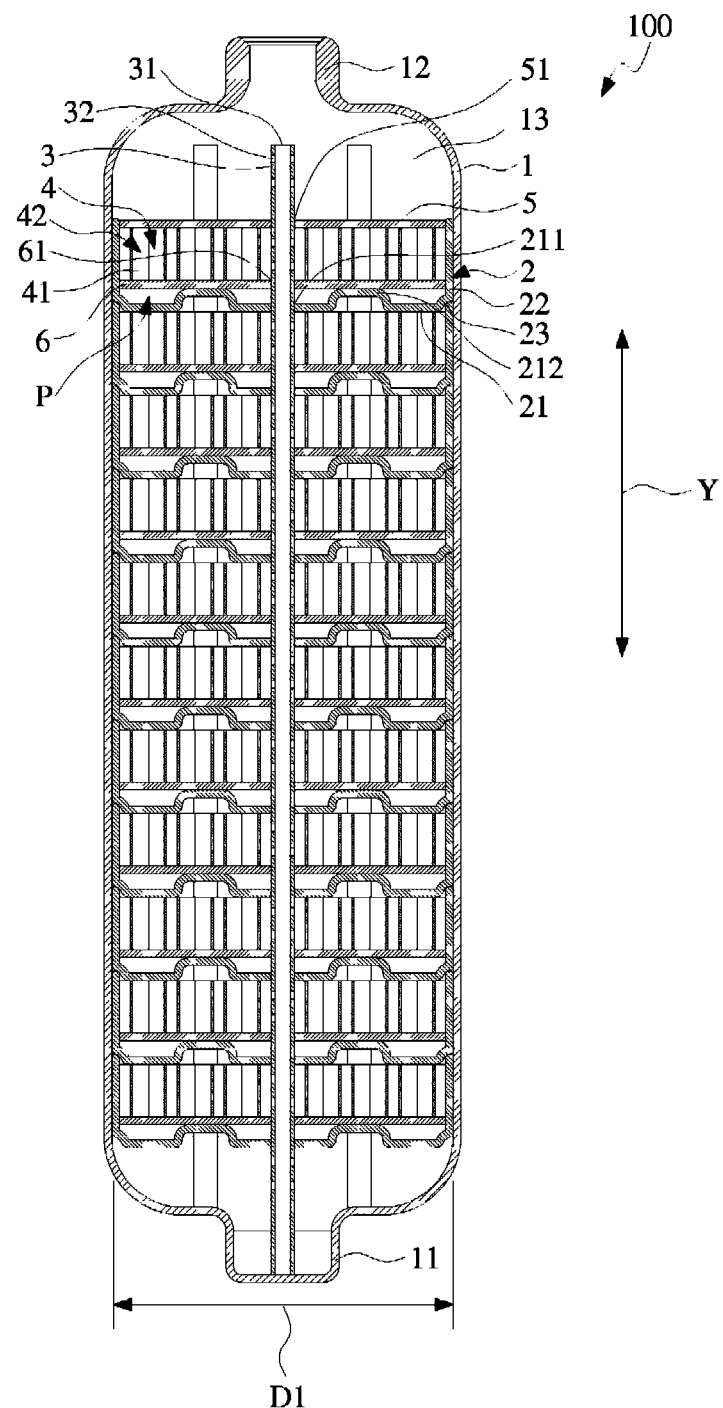
FIG. 2 is a schematic cross-sectional view illustrating the gas storage canister according to the first embodiment of the present invention.

FIG. 1 is a schematic exploded view illustrating a gas storage canister with a compartment structure or lattice according to a first embodiment of the present invention. FIG. 2 is a schematic cross-sectional view illustrating the gas storage canister according to the first embodiment of the present invention. The gas storage canister 100 comprises a canister body 1, a plurality of housings 2, at least one gas-guiding rod 3, and a plurality of compartment structures 4. The canister body 1 comprises a bottom end 11, an outlet 12 opposed to the bottom end 11, and an inner space 13. The bottom end 11 and the outlet 12 are arranged along a long axis direction Y.

The plurality of housings 2 are accommodated within the inner space 13 and stacked over each other along the long axis direction Y of the canister body 1. Each of the housings 2 comprises a base 21 and a peripheral wall 22. The peripheral wall 22 is vertically extended from a periphery of the base 21. Consequently, a receptacle P is defined by the base 21 and the peripheral wall 22. The base 21 has at least one communication part 211 (e.g. an aperture). In this embodiment, the housings 2 are made of a thermally-conductive material, so that the efficacy of heating the gas storage material is enhanced.

The gas-guiding rod 3 is a single-tube rode or a multi-tube rod penetrated through corresponding communication parts 211 of respective housings 2. Moreover, the gas-guiding rod 3 has at least one gas inlet/outlet end 31. Through the gas inlet/outlet end 31 of the gas-guiding rod 3, a gas can be guided to and adsorbed by the gas storage material, which is accommodated within the housings 2. In addition, through the gas inlet/outlet end 31 of the gas-guiding rod 3, the gas released from the gas storage material is guided to the outlet 12 of the canister body 1. In this embodiment, the gas-guiding rod 3 has at least one gas-guiding hole 32 corresponding to the receptacle P of each housing 2.

The compartment structures 4 are disposed within the receptacles P of respective housings 2. Each of the compartment structures 4 comprises a plurality of compartments 42. These compartments 42 are defined by partition plates 41 which are vertical to the base 21. Alternatively, these compartments 42 may be defined by parallel partition plates. Each of the compartments 42 is used for storing predetermined amount of gas storage material. The partition plates 41 are made of a thermally-conductive material, so that the efficacy of heating the gas storage material is enhanced. In this embodiment, the compartment structure 4 is a honeycomb-like structure. The shape of the compartment structure 4 is not restricted. For example, the compartment structure 4 is a rectangular structure, a square structure, a polygonal structure, an irregular shape or a circular structure. The special profile of the compartment structure 4 can reinforce the structural strength of the housing 2. Consequently, when the gas storage material is suffered from thermal expansion, the deformation of the housing 2 is minimized.

Moreover, the gas storage canister 100 further comprises a cover 5. The cover 5 has at least one first opening 51 corresponding to the communication part 211 of the housing 2. The cover 5 is disposed over the housing 2 which is the closest to the outlet 12 of the canister body 1, so that the gas storage material can be retained within the housing 2.

Figure 3:
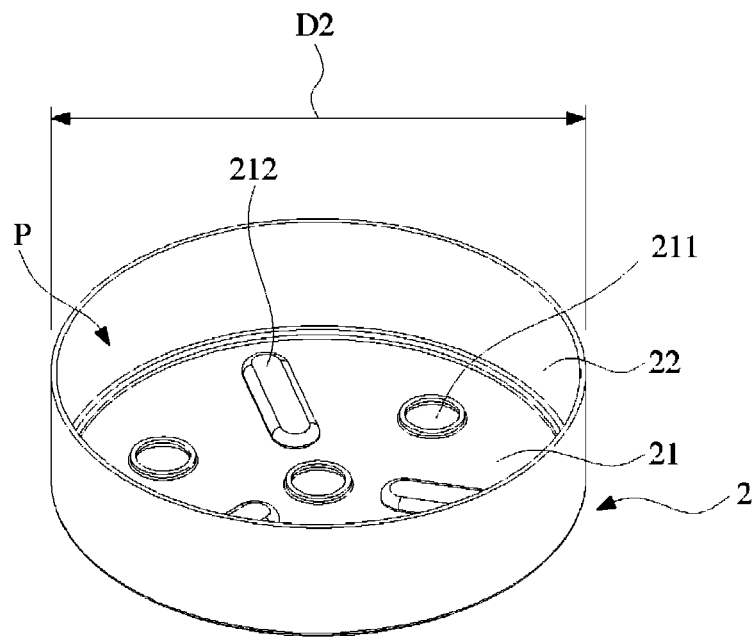
FIG. 3 is a schematic perspective view illustrating a housing of the gas storage canister according to the first embodiment of the present invention.
Figure 4:
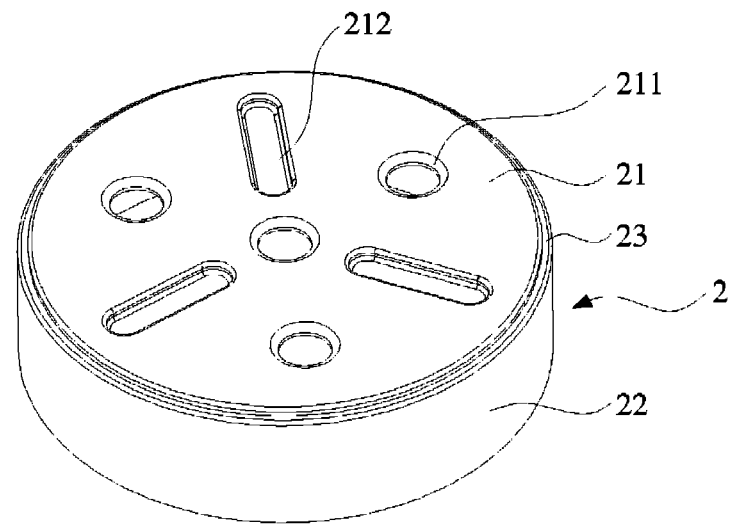
FIG. 4 is a schematic perspective view illustrating the housing of FIG. 3 and taken along another viewpoint.

FIG. 3 is a schematic perspective view illustrating a housing of the gas storage canister according to the first embodiment of the present invention. FIG. 4 is a schematic perspective view illustrating the housing of FIG. 3 and taken along another viewpoint. Please refer to FIGS. 1, 2, 3 and 4. The canister body 1 has an inner diameter D1. The housing 2 has an outer diameter D2. The inner diameter D1 of the canister body 1 is substantially equal to the outer diameter D2 of the housing 2. After the housing 2 is accommodated within the inner space 13 of the canister body 1, the peripheral wall 22 of the housing 2 and the inner wall of the canister body 1 are in contact with each other. In this embodiment, a concave ring-shaped edge structure 23 is formed at a junction between the base 21 and the peripheral wall 22 of the housing 2. After the plurality of housings 2 are accommodated within the inner space 13 of the canister body 1, every two adjacent housings 2 are engaged with each other through the peripheral wall 22 and the concave ring-shaped edge structure 23. Consequently, the positioning and sealing efficacy of these housings 2 will be enhanced.

Moreover, a plate 6 is arranged between the base 21 of the housing 2 and the compartment structure 4. The plate 6 has at least one second opening 61 corresponding to the communication part 211 of the housing 2. A plurality of ribs 212 are formed on the base 21 of the housing 2. Since the plate 6 is supported by the ribs 212, there is a predetermined distance between the plate 6 and the base 21 of the housing 2. The plate 6 accommodated within the housing 2 and the compartment structure 4 can enhance structural strength and tightness of the housing 2. In this embodiment, the plate 6 is made of a metallic material. Consequently, the plate 6 can facilitate conducting heat to the gas storage material uniformly in order to result in smooth operation of the gas storage canister.

Figure 5:
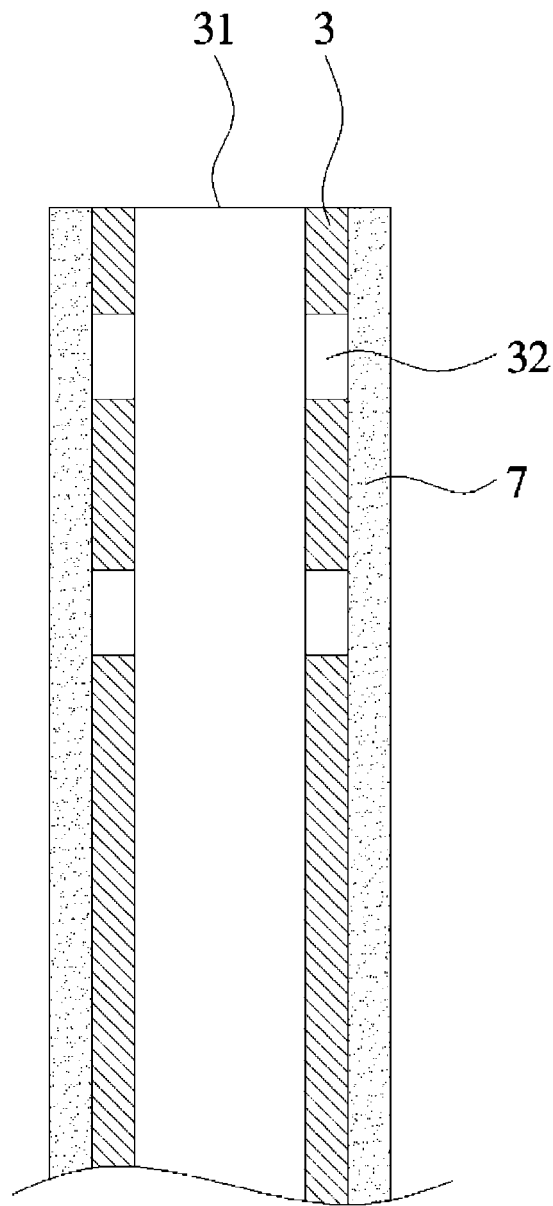
FIG. 5 is a schematic perspective view illustrating a gas-guiding rod of the gas storage canister according to the first embodiment of the present invention.

FIG. 5 is a schematic perspective view illustrating a gas-guiding rod of the gas storage canister according to the first embodiment of the present invention. The gas-guiding rod 3 further comprises a retainer layer or a filtering layer 7, wherein only the gas is allowed to be transmitted through the filtering layer 7. During the gas released from or adsorbed by the gas storage material is transferred through the gas-guiding hole 32 of the gas-guiding rod 3, the filtering layer 7 can shelter the gas-guiding hole 32 to achieve isolating and filtering efficacy, thereby preventing the gas storage material from being leaked out.

Figure 6:
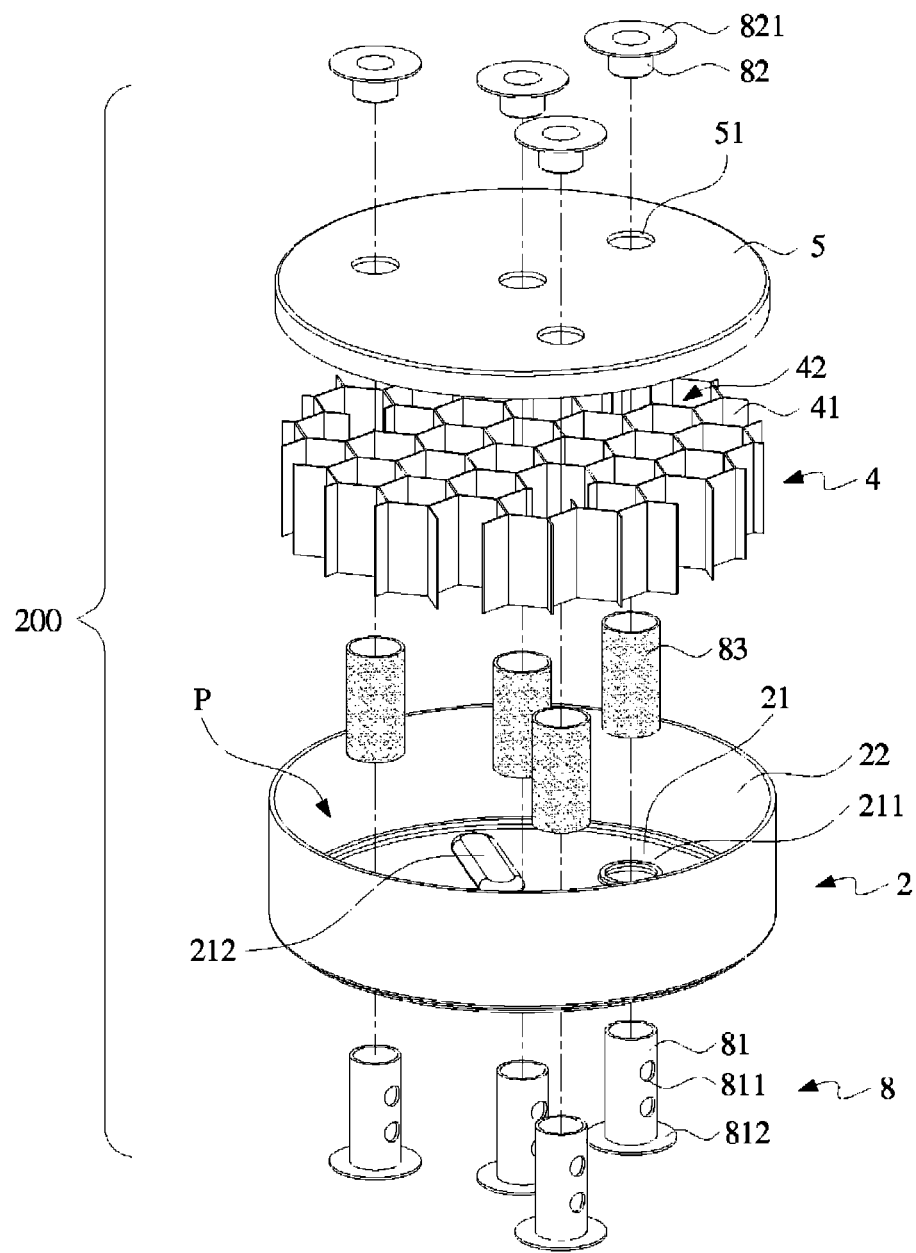
FIG. 6 is a schematic exploded view illustrating a gas storage cartridge of the gas storage canister according to the first embodiment of the present invention.

FIG. 6 is a schematic exploded view illustrating a gas storage cartridge of the gas storage canister according to the first embodiment of the present invention. As shown in FIG. 6, the gas storage cartridge 200 comprises a housing 2, a compartment structure 4, and a cover 5. The housing 2 comprises a base 21 and a peripheral wall 22. The peripheral wall 22 is vertically extended from a periphery of the base 21. The base 21 of the housing 2 has at least one communication part 211. The cover 5 is accommodated within the top and inner periphery of the peripheral wall 22 of the housing 2. Consequently, a receptacle P is defined by the housing 2 and the cover 5. The cover 5 has at least one first opening 51 corresponding to the communication part 211 of the housing 2. The compartment structure 4 is disposed within the receptacle P between the cover 5 and the housing 2. The compartment structure 4 comprises a plurality of compartments 42. These compartments 42 are defined by partition plates 41. Each of the compartments 42 is used for storing a predetermined amount of gas storage material. In this embodiment, the compartment structure 4 is a honeycomb-like structure. The special profile of the compartment structure 4 can reinforce the structural strength of the housing 2. Consequently, when the gas storage material is suffered from thermal expansion, the deformation of the housing 2 is minimized.

The housing 2 and the cover 5 are combined together through a fastening member 8. The fastening member 8 comprises at least one sleeve 81 and at least one fixing element 82. The sleeve 81 has at least one gas-guiding hole 811 and an enlarged end 812. The fixing element 82 has an enlarged end 821. A process of assembling the gas storage cartridge 200 will be illustrated as follows. Firstly, the sleeve 81 is penetrated through the communication part 211 of the base 21 from bottom to top. Then, a filtering layer 83 is sheathed around the sleeve 81 to be served as a gas-conducting structure. Then, the compartment structure 4 is accommodated within the receptacle P of the housing 2. Meanwhile, each of the compartments 42 of the compartment structure 4 is uniformly filled with a predetermined amount of gas storage material. Then, the housing 2 is covered with the cover 5. Afterwards, the fixing element 82 is embedded into the sleeve 81 through the first opening 51 of the cover 5 from top to bottom. In such way, the gas storage cartridge 200 is assembled.

Figure 7:
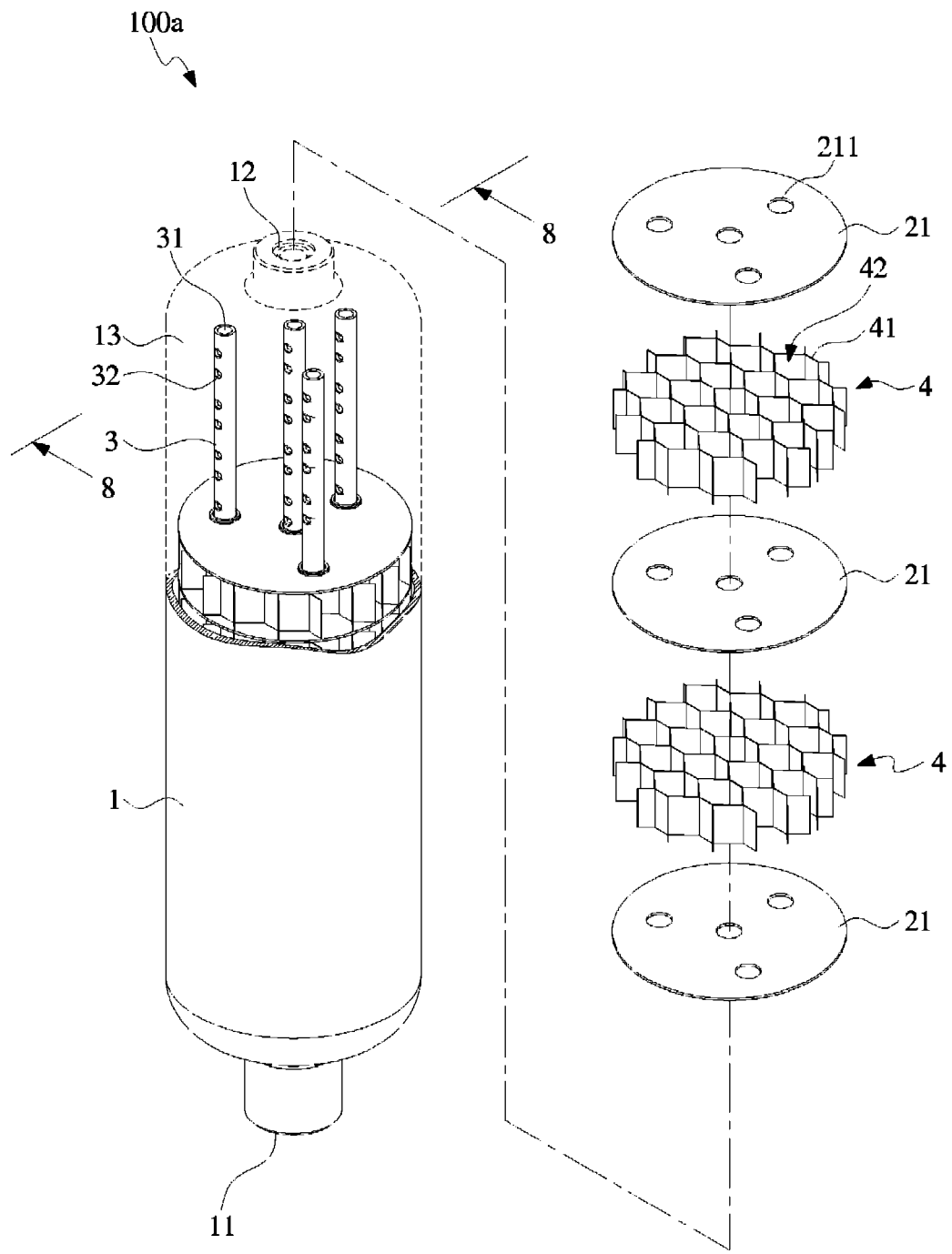
FIG. 7 is a schematic exploded view illustrating a gas storage canister with a compartment structure according to a second embodiment of the present invention.
Figure 8:
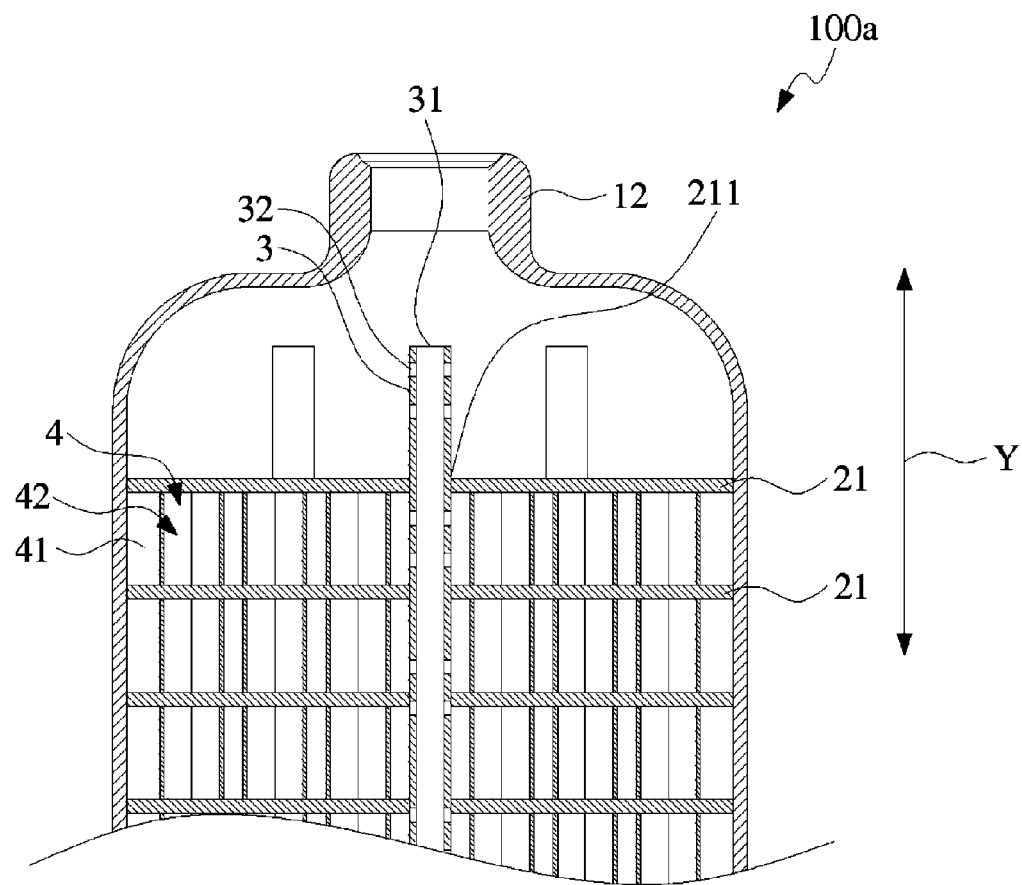
FIG. 8 is a schematic cross-sectional view illustrating the gas storage canister of FIG. 7 and taken along the line 8-8.

FIG. 7 is a schematic exploded view illustrating a gas storage canister with a compartment structure or lattice according to a second embodiment of the present invention. FIG. 8 is a schematic cross-sectional view illustrating the gas storage canister of FIG. 7 and taken along the line 8-8. The concepts of the second embodiment are expanded from the concepts of the first embodiment. In this embodiment, the housing 2 of the gas storage canister 100a is simplified. That is, the bases 21 and the compartment structures 4 are alternately stacked over each other to assemble the gas storage canister 100a.

Figure 9:
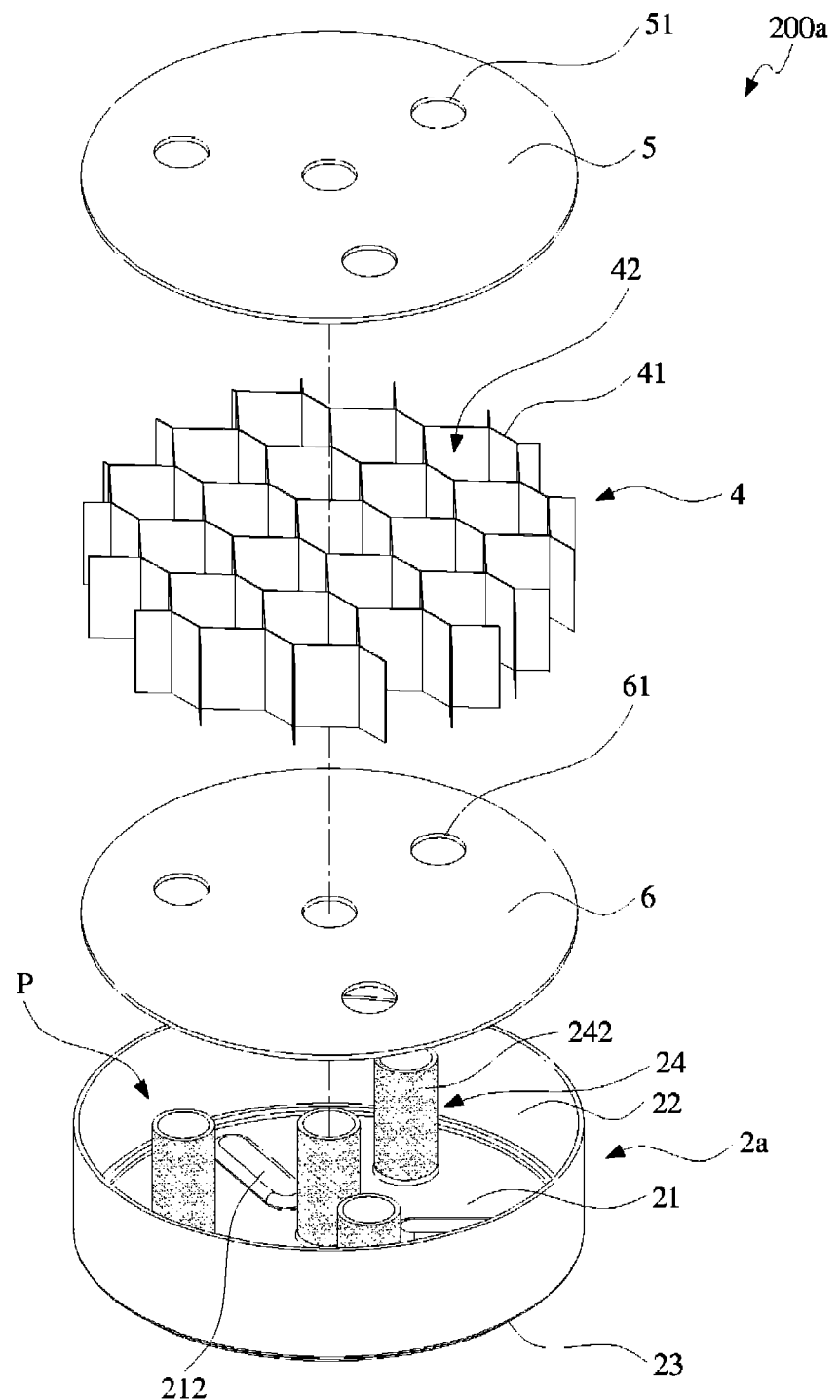
FIG. 9 is a schematic exploded view illustrating a gas storage cartridge of the gas storage canister according to a third embodiment of the present invention.
Figure 10:
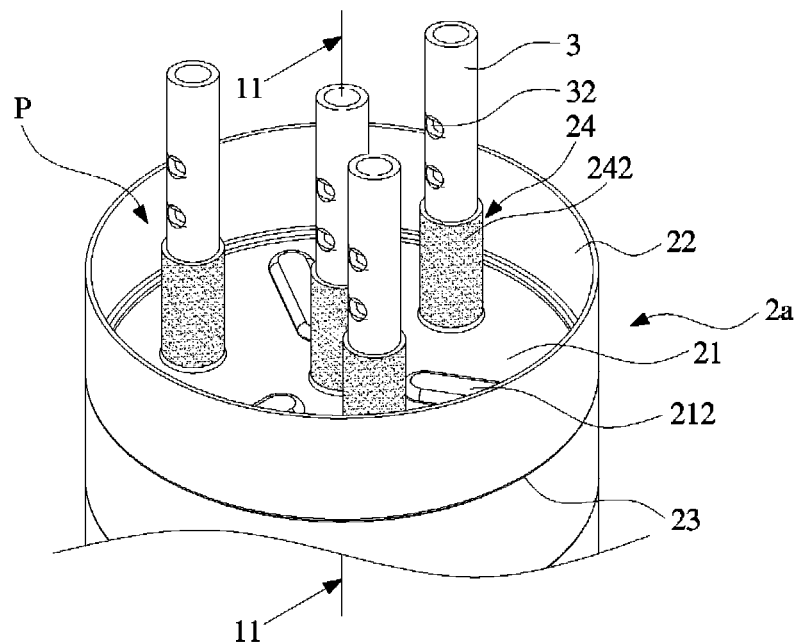
FIG. 10 is a schematic perspective view illustrating the gas storage cartridge in the stacked state to indicate that the gas-guiding rod is penetrated through the housing.

FIG. 9 is a schematic exploded view illustrating a gas storage cartridge of the gas storage canister according to a third embodiment of the present invention. FIG. 10 is a schematic perspective view illustrating the gas storage cartridge in the stacked state. As shown in FIG. 10, the gas-guiding rod 3 is penetrated through the housing 2a. Except for the following items, the configurations and operations of the gas storage cartridge are similar to those of the first embodiment, and are not redundantly described herein. In this embodiment, the gas storage cartridge 200a further comprises at least one gas-conducting structure 24. The gas-conducting structure 24 is vertically and upwardly extended from the aperture wall of the communication part 211 of the housing 2a by a predetermined height L. In addition, the gas-guiding rod 3 is penetrated through the gas-conducting structure 24. The predetermined height L is substantially equal to the height of the peripheral wall 22 of the housing 2. That is, the communication part 211 of the housing 2a corresponding to the gas-conducting structure 24 is sealed by the gas-conducting structure 24, thereby preventing the gas storage material from being leaked out to other housing 2a through the communication part 211. Before the gas storage canister 100a is assembled, the housing 2a equipped with the plate 6 and the compartment structure 4 has been previously charged with the gas storage material. After the compartments 42 are filled with the gas storage material, the housing 2 is covered with the cover 5. In such way, the gas storage cartridge is modularized in order to facilitate production, assembly and application. Alternatively, the gas-guiding rod 3 may be omitted. Under this circumstance, the gas-conducting structure 24 installed on the housing 2a can achieve the function of introducing or releasing the gas. Moreover, the junction between any two adjacent housings 2a may be equipped with convex/concave engaging elements or tenons in order to facilitate positioning the housings 2a.

Figure 11:
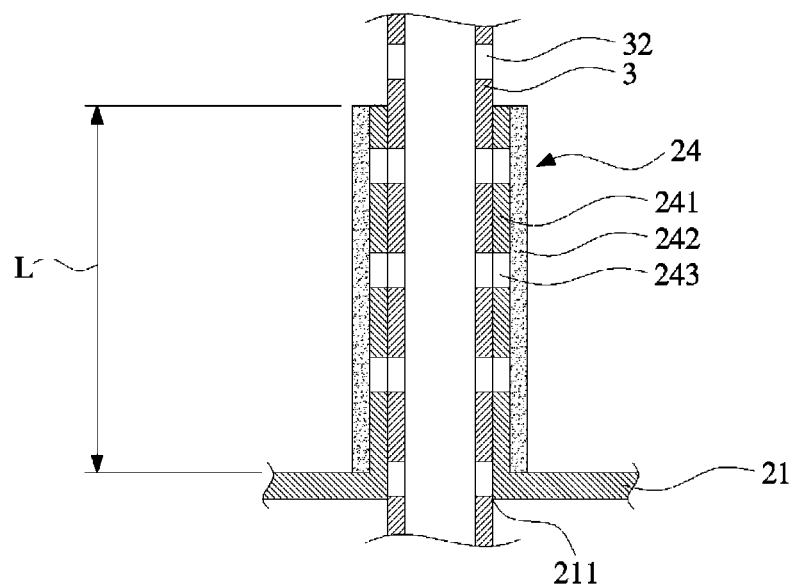
FIG. 11 is a schematic cross-sectional view illustrating the gas storage canister of FIG. 10 and taken along the line 11-11.

FIG. 11 is a schematic cross-sectional view illustrating the gas storage canister of FIG. 10 and taken along the line 11-11. As shown in FIG. 11, the gas-conducting structure 24 comprises a tube structure 241 and a filtering layer 242. The tube structure 241 is vertically and upwardly extended from the aperture wall of the communication part 211 of the housing 2 by a predetermined height L. In addition, the tube structure 241 has at least one vent 243 for conducting the gas. The filtering layer 242 is sheathed around the tube structure 241 for preventing the gas storage material from being leaked out to other housing 2 through the communication part 211. In this embodiment, the predetermined height L is substantially equal to the distance between the base 21 of the housing 2a and the cover 5. That is, the communication part 211 of the housing 2 and the first opening 51 of the cover 5 corresponding to the gas-conducting structure 24 are sealed by the gas-conducting structure 24, thereby preventing the gas storage material from being leaked out to other housing 2a. Of course, the gas-conducting structure 24 may be directly selected from the gas filtering layer which is made of a filtering material with high hardness and hard density. The concepts of the third embodiment may be further expanded.

Figure 12:
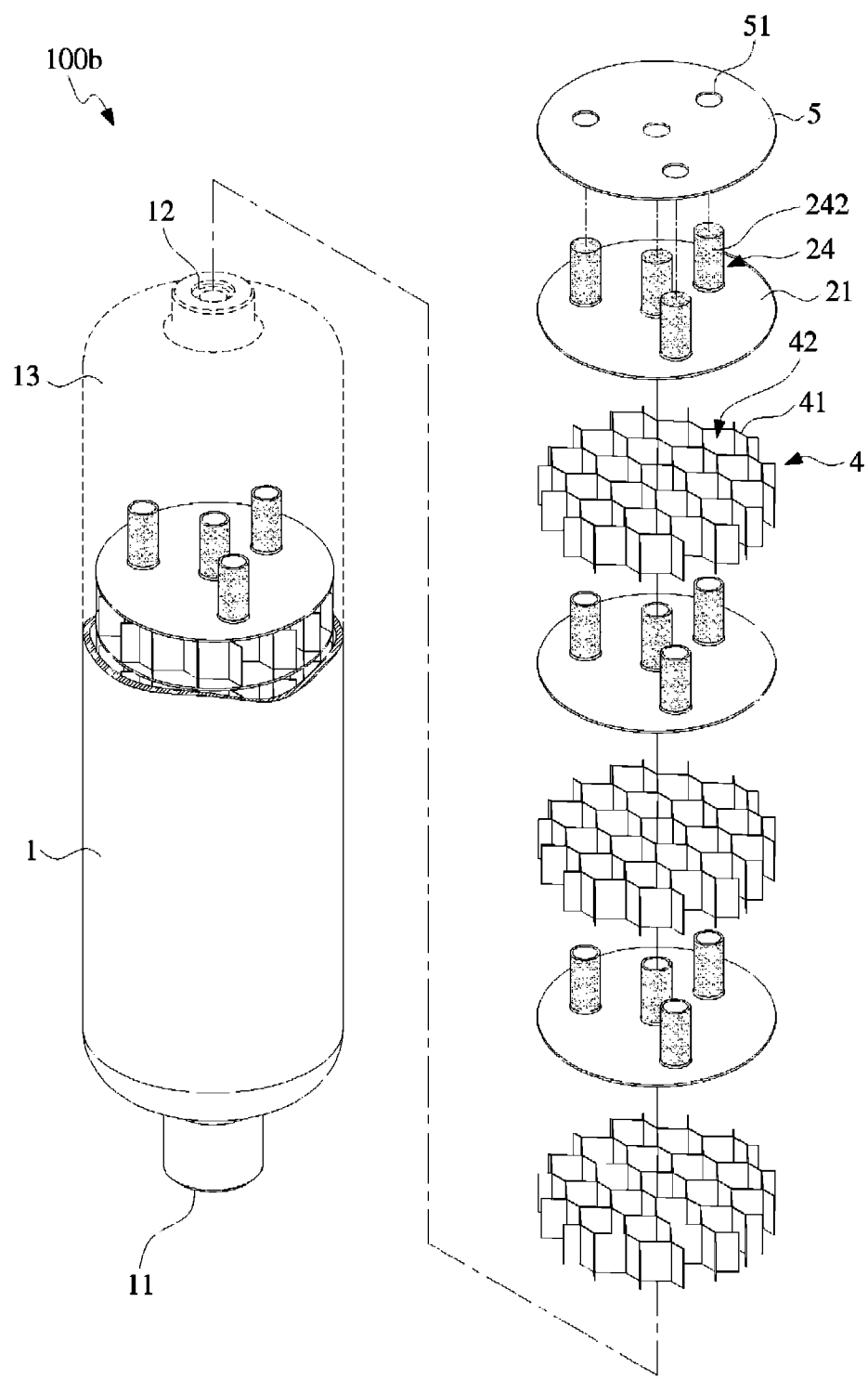
FIG. 12 is a schematic exploded view illustrating a gas storage canister with a compartment structure according to a fourth embodiment of the present invention.
Figure 13:
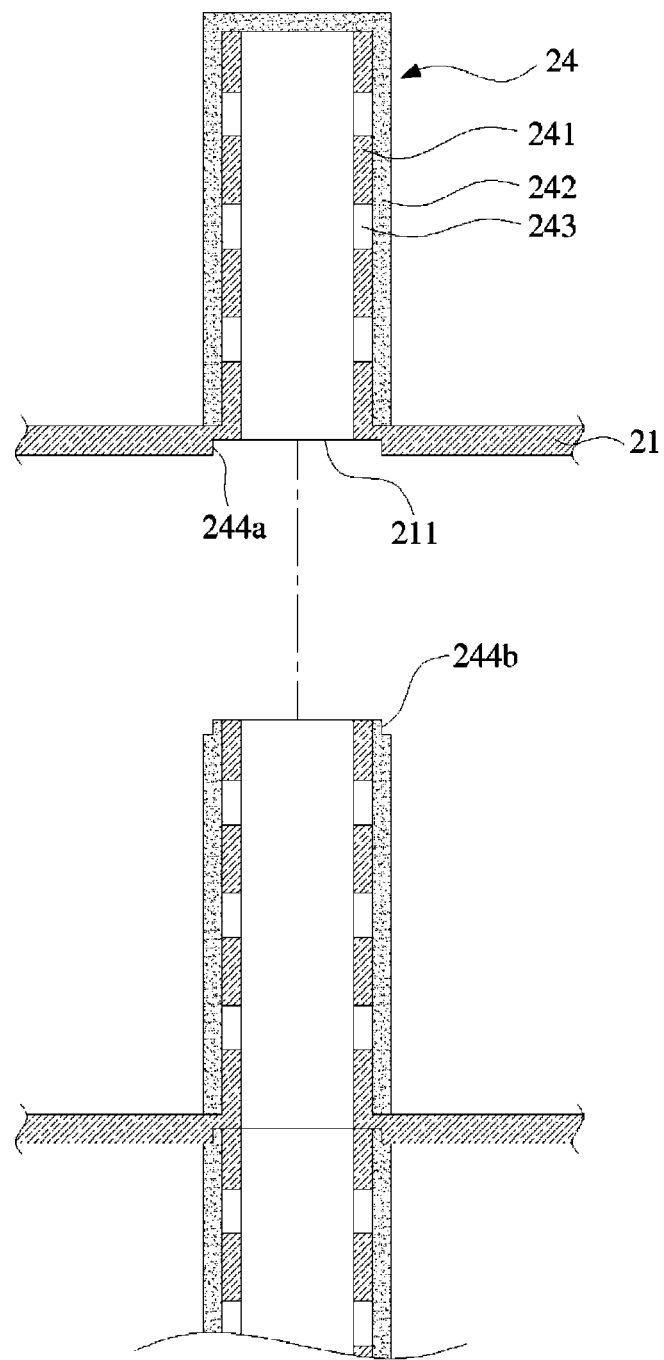
FIG. 13 is a schematic cross-sectional view illustrating a housing of the gas storage canister according to a fourth embodiment of the present invention.

FIG. 12 is a schematic exploded view illustrating a gas storage canister with a compartment structure or lattice according to a fourth embodiment of the present invention. FIG. 13 is a schematic cross-sectional view illustrating a housing of the gas storage canister according to a fourth embodiment of the present invention. In the gas storage canister 100b, the bases 21 with the gas-conducting structure 24 and the compartment structures 4 are alternately stacked over each other to assemble the gas storage canister 100b. Moreover, the communication part 211 of each base 21 has a tenon 244a, and the gas-conducting structure 24 has a tenon 244b. The engagement between the tenons 244a and 244b can facilitate positioning the base 21. Consequently, the adjacent gas-conducting structures 24 can be in communication with each other to conduct the gas. Alternatively, the filtering layer 242 of the gas-conducting structure 24 may be closed-ended in order to prevent the gas storage material from being leaked out.

Figure 14:
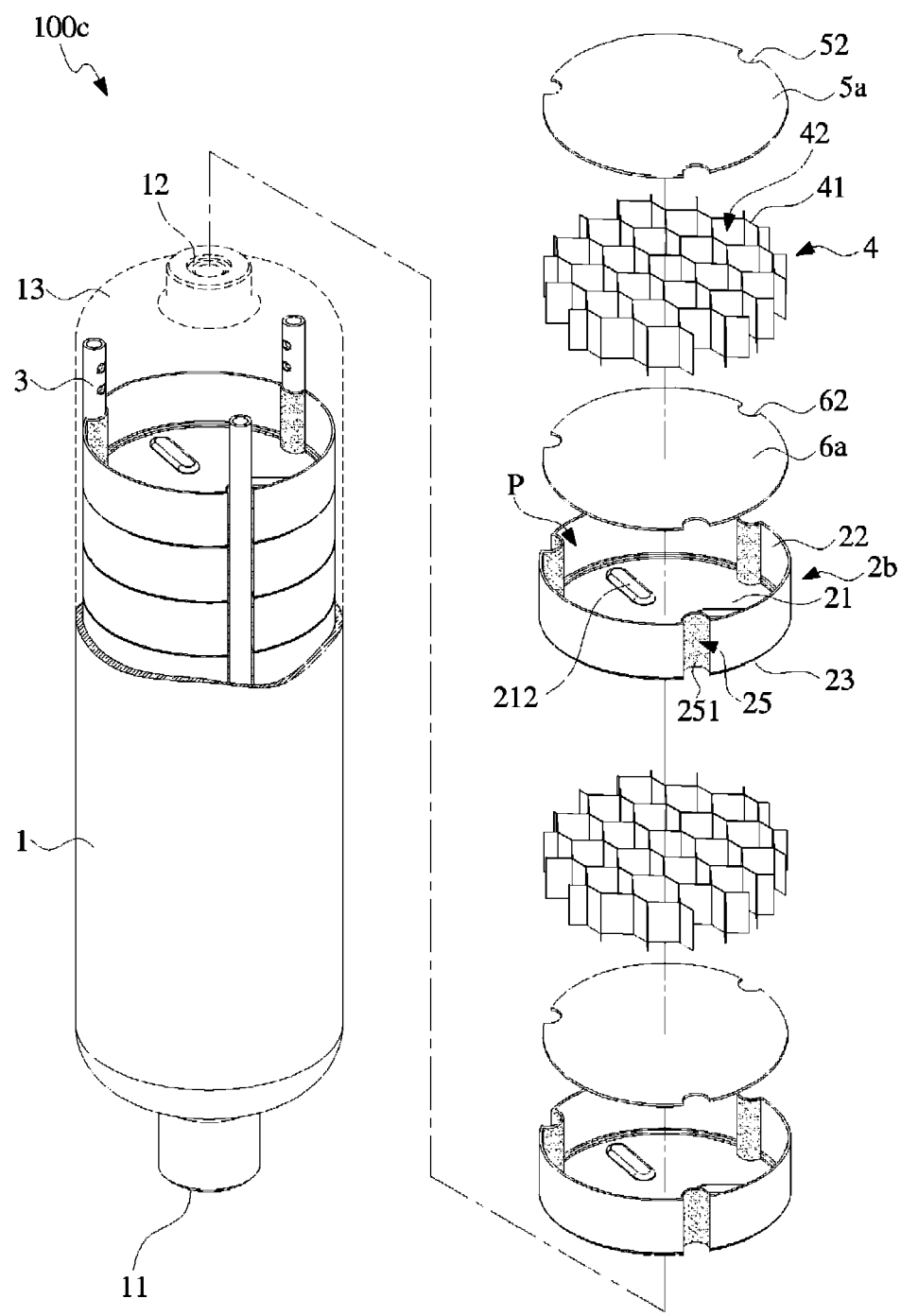
FIG. 14 is a schematic exploded view illustrating a gas storage canister with a compartment structure according to a fifth embodiment of the present invention.

FIG. 14 is a schematic exploded view illustrating a gas storage canister with a compartment structure or lattice according to a fifth embodiment of the present invention. Except for the following items, the configurations and operations of the gas storage cartridge are similar to those of the first embodiment. In the gas storage canister 100c, at least one gas-conducting structure 25 is formed on the peripheral wall 22 of the housing 2b. The gas-conducting structure 25 is a concave structure 251 by bending the base 21 and the peripheral wall 22 toward the receptacle P. The gas-conducting structure 25 may be directly selected from the gas filtering layer which is made of a filtering material with high hardness and hard density. The gas-guiding rod 3 is accommodated within the gas-conducting structures 25 of corresponding housings 2b. Consequently, through the gas-conducting structures 25, the gas can be introduced to and adsorbed by the gas storage material, which is accommodated within the compartment structures 4 of the housings 2b. In addition, through the gas-conducting structures 25 and the gas-guiding rod 3, the gas released from the gas storage material is guided to the outlet 12 of the canister body 1. Alternatively, the gas-guiding rod 3 may be omitted. Under this circumstance, the gas-conducting structure 25 installed on the housing 2b can achieve the function of introducing or releasing the gas. Moreover, the junction between any two adjacent housings 2a may be equipped with convex/concave engaging elements or tenons in order to facilitate positioning the housings 2b.

Figure 15:
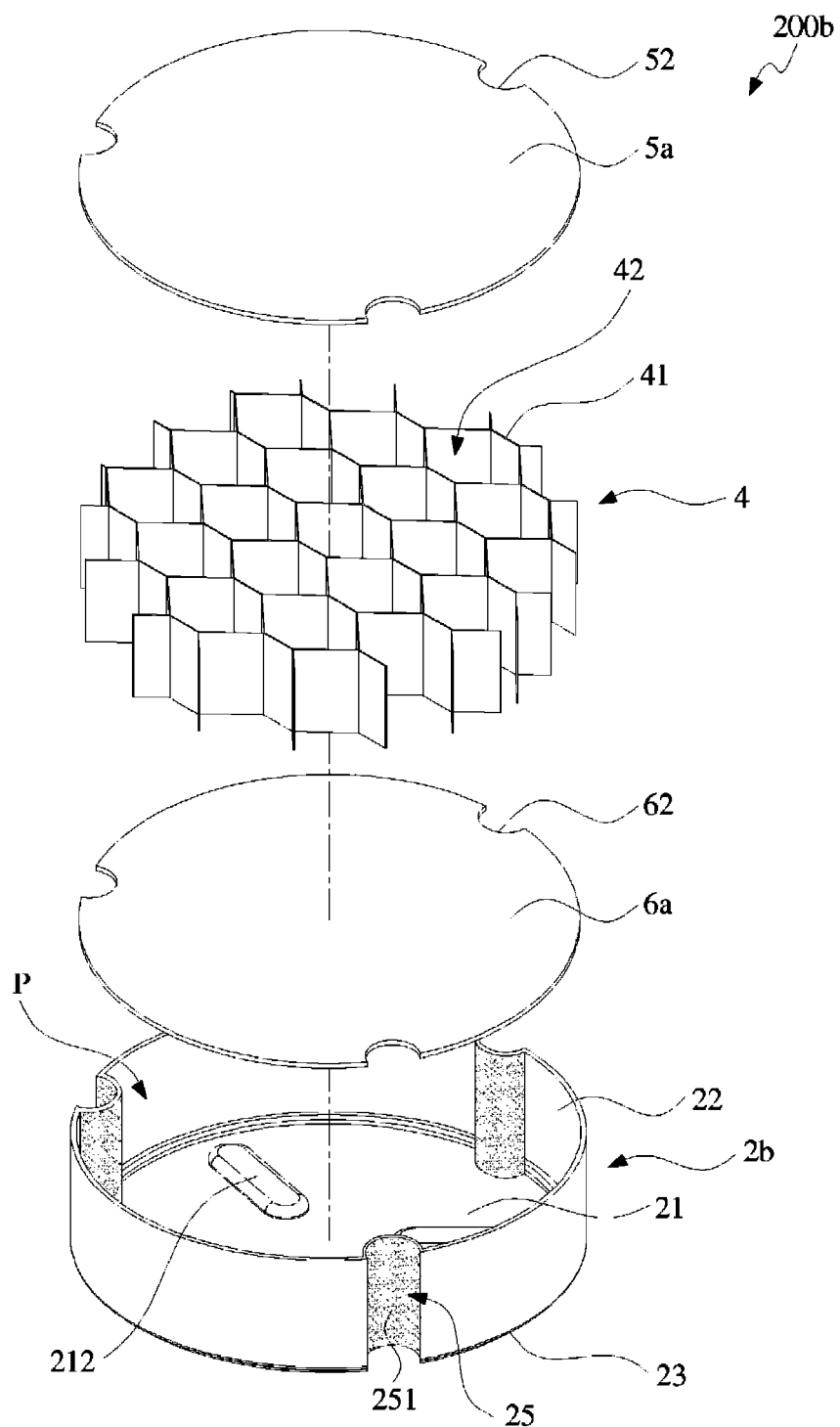
FIG. 15 is a schematic exploded view illustrating a gas storage cartridge of the gas storage canister according to the fifth embodiment of the present invention.

FIG. 15 is a schematic exploded view illustrating a gas storage cartridge of the gas storage canister according to the fifth embodiment of the present invention. In the gas storage canister 200b, at least one gas-conducting structure 25 is formed on the peripheral wall 22 of the housing 2b. Through the gas-conducting structures 25, the gas can be introduced to and adsorbed by the gas storage material, which is accommodated within the housings 2b. In addition, through the gas-conducting structures 25, the gas released from the gas storage material is guided to the outlet 12 of the canister body 1. In this embodiment, the cover 5a has at least one notch 52 corresponding to the gas-conducting structure 25 of the housing 2b. Consequently, after the gas storage canisters 200b are stacked over each other, the gas can be conducted through the notch 52. Alternatively, the cover 5a has a vertical and downward edge with a predetermined height for facilitating coupling the cover 5a with the housing 2b. The gas storage canisters 200b further comprises a plate 6a. The plate 6a has at least one second notch 62 corresponding to the gas-conducting structure 25 of the housing 2b, so that the plate 6a can be accommodated within the housing 2b. Since the base 21 of the housing 2b, the cover 5a and the plate 6a have no communication part or opening, the problem of leaking out the gas storage material will be eliminated. Before the gas storage canister 100d is assembled, the housing 2b equipped with the plate 6a and the compartment structure 4 has been previously charged with the gas storage material. After the compartments 42 are filled with the gas storage material, the housing 2b is covered with the cover 5a. In such way, the gas storage cartridge is modularized in order to facilitate production, assembly and application.

Figure 16:
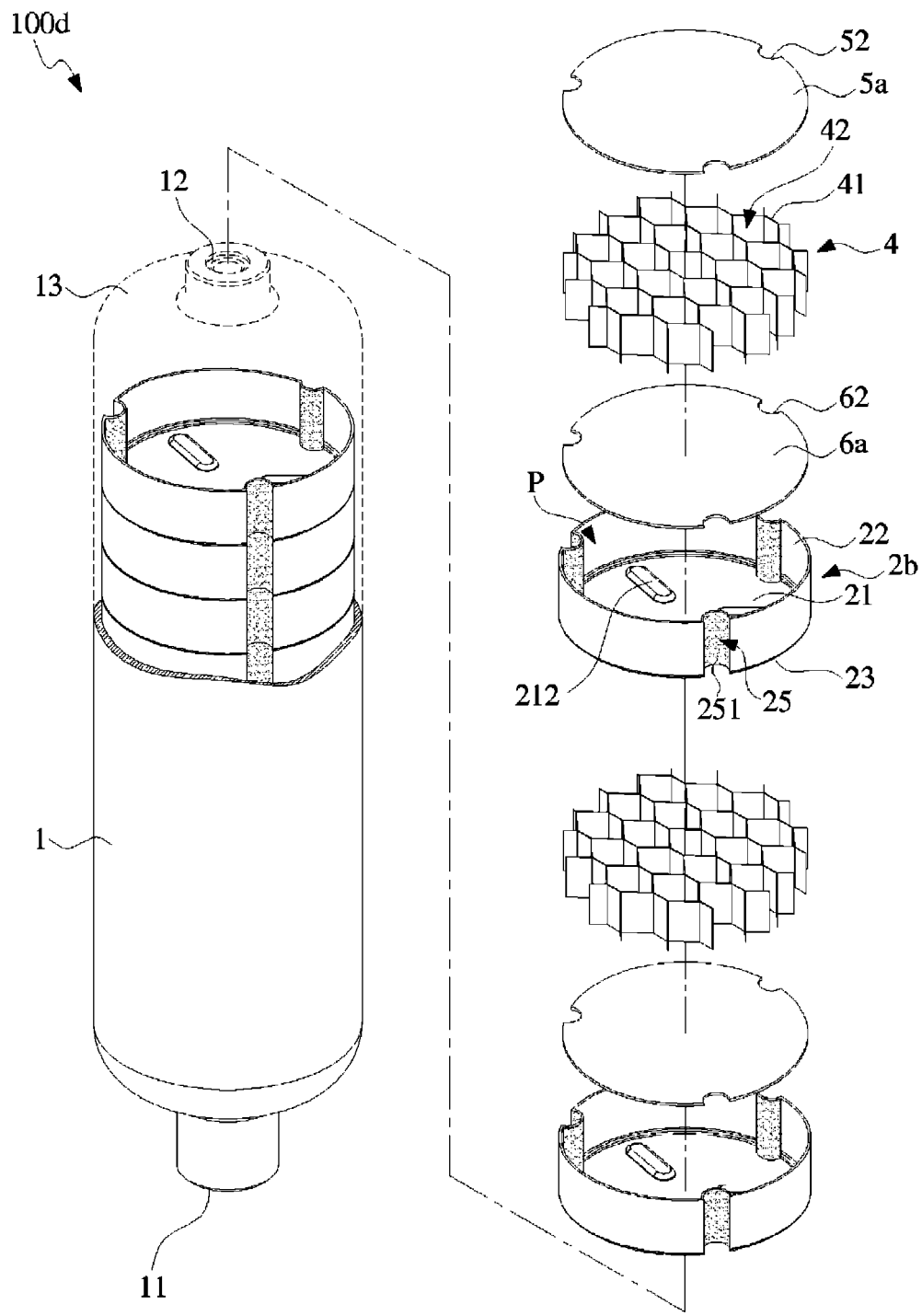
FIG. 16 is a schematic exploded view illustrating a gas storage canister with a compartment structure according to a sixth embodiment of the present invention.

FIG. 16 is a schematic exploded view illustrating a gas storage canister with a compartment structure or lattice according to a sixth embodiment of the present invention. The concepts of the sixth embodiment are expanded from the concepts of the fifth embodiment. Alternatively, in the gas storage canister 100d, the gas-guiding rod 3 may be omitted. Under this circumstance, the gas-conducting structures 25 of the housings 2b are collectively formed as a gas channel for conducting the gas. Alternatively, the periphery of the concave ring-shaped edge structure 23 of the housings 2b may have a plurality of bumps, and the peripheral wall 22 corresponding to the bumps may have positioning structures such as concave edges (not shown).

Figure 17:
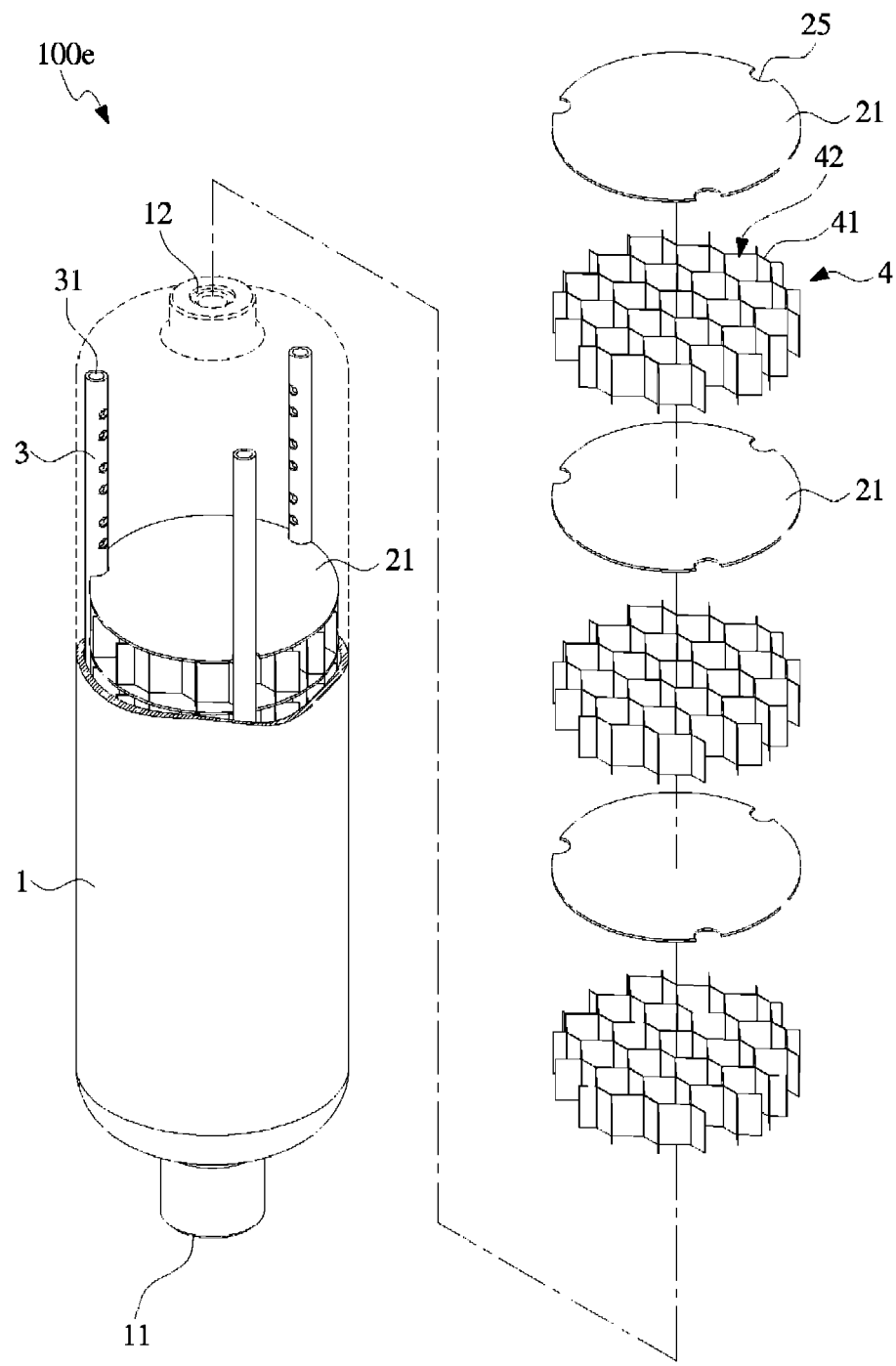
FIG. 17 is a schematic exploded view illustrating a gas storage canister with a compartment structure according to a seventh embodiment of the present invention.

FIG. 17 is a schematic exploded view illustrating a gas storage canister with a compartment structure or lattice according to a seventh embodiment of the present invention. In this embodiment, the bases 21 and the compartment structures 4 are alternately stacked over each other to assemble the gas storage canister 100e. The gas-conducting structure 25 is the communication part (e.g. a notch) at the periphery of the base 21. The gas-guiding rod 3 is accommodated within the gas-conducting structures 25 of corresponding bases 21. Consequently, the base 21 and the compartment structure 4 may be directly selected from the gas filtering layer which is made of a filtering material with high hardness and hard density. Under this circumstance, the gas-guiding efficacy of the gas storage canister is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gas storage canister, comprising:
    a canister body having a bottom end, an outlet opposed to said bottom end, and an inner space;
    a housing within said inner space, said housing comprising:
        a base and a peripheral wall defining a receptacle, wherein said base has at least one communication aperture;
        a plate within said receptacle and disposed upon said base;
        a lattice housed within receptacle and disposed upon said plate, said lattice defining a matrix of compartments, wherein each of said compartments stores a predetermined amount of gas; and
        a cover disposed upon said lattice; and
    at least one gas-guiding rod penetrating said communication aperture of said base and extending through said lattice, said gas-guiding rod having an open end and at least one gas-guiding hole.

2. The gas storage canister according to claim 1, wherein said peripheral wall extends vertically from a periphery of said base.

3. The gas storage canister according to claim 1, wherein said cover has at least one first opening corresponding to said communication aperture, wherein said cover is disposed over said housing so that said gas is retained within said housing.

4. The gas storage canister according to claim 1, wherein said plate is arranged between said base and said lattice, and has at least one second opening corresponding to said communication aperture of said base, wherein at least one rib is formed on said base for supporting said plate and spacing a portion of said plate from a portion of said base.

5. The gas storage canister according to claim 1, wherein said at least one gas-guiding hole corresponds to said matrix of compartments and said gas-guiding rod is covered with a filtering layer.

6. The gas storage canister according to claim 1, wherein a concave ring-shaped edge structure is formed at a junction between said base and said peripheral wall.

* * * * *